(12) United States Patent
Wang

(10) Patent No.: US 12,548,348 B2
(45) Date of Patent: Feb. 10, 2026

(54) TARGET DETECTION METHOD FOR BLIND AREAS OF VEHICLE, TARGET DETECTION DEVICE, ELECTRONIC DEVICE, AND SOTRAGE MEDIUM

(71) Applicant: HON HAI PRECISION INDUSTRY CO., LTD., New Taipei (TW)

(72) Inventor: Po-Chung Wang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 269 days.

(21) Appl. No.: 18/378,094

(22) Filed: Oct. 9, 2023

(65) Prior Publication Data

US 2025/0078521 A1    Mar. 6, 2025

(30) Foreign Application Priority Data

Aug. 31, 2023    (CN) .......................... 202311119031.4

(51) Int. Cl.
  *G06V 20/58*    (2022.01)
  *G06V 10/22*    (2022.01)
  *G06V 10/25*    (2022.01)
  *G06V 10/26*    (2022.01)
  *G06V 10/36*    (2022.01)

(52) U.S. Cl.
  CPC ............ *G06V 20/58* (2022.01); *G06V 10/225* (2022.01); *G06V 10/25* (2022.01); *G06V 10/267* (2022.01); *G06V 10/36* (2022.01); *G06V 2201/07* (2022.01); *G06V 2201/08* (2022.01)

(58) Field of Classification Search
  CPC .... G06V 20/58; G06V 10/267; G06V 10/225; G06V 10/36; G06V 2201/07; G06V 2201/08; G06V 10/25
  See application file for complete search history.

(56) References Cited

U.S. PATENT DOCUMENTS

2022/0405952 A1* 12/2022 Niesen .................. G06T 7/70
2023/0206654 A1*  6/2023 Guo ...................... G06T 7/70
                                                           382/103

FOREIGN PATENT DOCUMENTS

CN           114359848        4/2022

* cited by examiner

*Primary Examiner* — David Perlman
(74) *Attorney, Agent, or Firm* — ScienBiziP, P.C.

(57) ABSTRACT

A target detection method for blind areas of a vehicle includes acquiring a real-time image of one of the blind areas of a vehicle; determining a region of interest (ROI) image based on the real-time image; determine a image to be detected based on the ROI image and the real-time image; inputting the image to be detected to a target detection model to generate a first detection box in the first scaled image corresponding to a detection target in the real-time image and a second detection box in the second scaled image corresponding to the detection target in the ROI image; and determining a detection result for the blind area of the vehicle based on the first detection box and the second detection box.

17 Claims, 8 Drawing Sheets

— TARGET DETECTION METHOD FOR BLIND AREAS OF VEHICLE, TARGET DETECTION DEVICE, ELECTRONIC DEVICE, AND SOTRAGE MEDIUM

FIELD

The subject matter relates to assisting driving technologies, and more particularly, to a target detection method for blind areas of a vehicle, a target detection device for blind areas of a vehicle, an electronic device, and a storage medium.

BACKGROUND

Currently, many vehicles are equipped with blind area detection systems. These systems primarily rely on cameras installed around the vehicle to acquire real-time images of the blind area of the vehicle. The captured images are analyzed to detect targets such as pedestrians or vehicles. The system outputs the detection results for the blind area of the vehicle and enhances the overall driving safety of the vehicle. However, the blind area detection system may suffer from false detections, which can undermine the safety of vehicle operation.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the disclosure.

It should be understood that, the terms "first" and "second" are used to distinguish between elements and are not used to denote a particular order or imply a number of technical features, therefore, unless specifically defined otherwise, features described with "first" and "second" may expressly or implicitly include one or more of the stated features. In the description of the present application, "plurality" means two or more, unless otherwise expressly and specifically defined.

In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described.

The term "comprising," when utilized, means "including, but not necessarily limited to"; it specifically indicates open-ended inclusion or membership in the so-described combination, group, series, and the like.

The hereinafter-described embodiments of the disclosure are presented herein by way of exemplification and not limitation, with reference to the figures.

Figure 1:
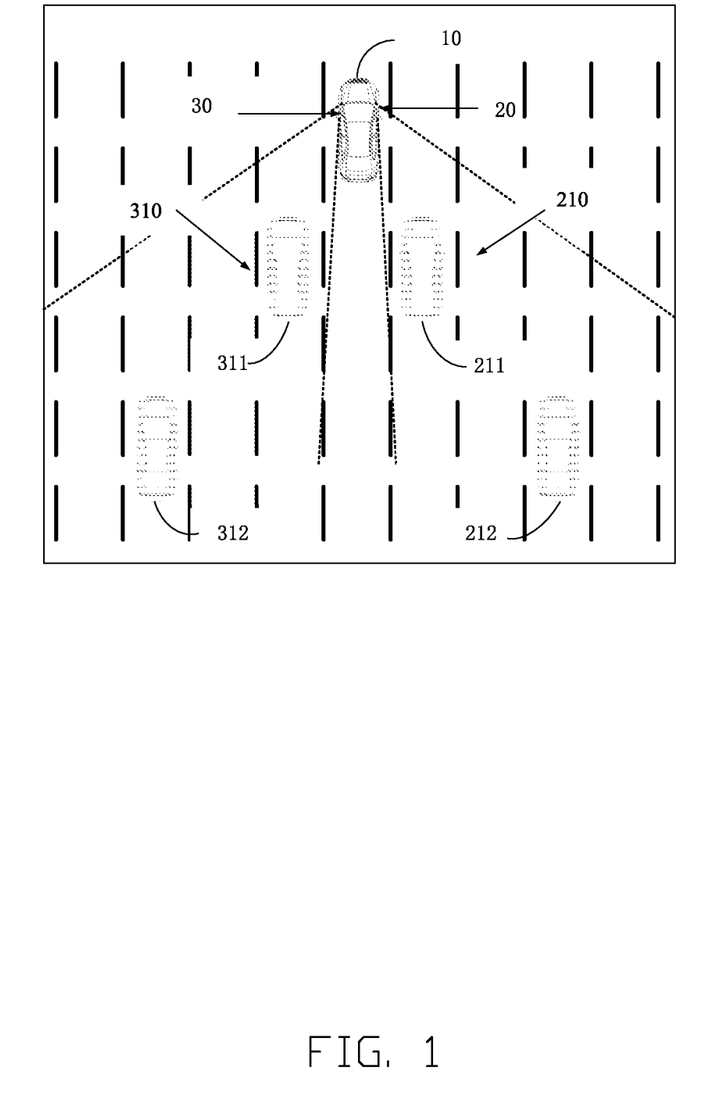
FIG. 1 is an embodiment of an application environment diagram of a target detection method for blind areas of a vehicle according to the disclosure.

FIG. 1 is an application environment diagram of one embodiment of the disclosure. A target detection method for blind areas of a vehicle provided by the disclosure can be applied to one or more vehicle's onboard systems. During traveling of a vehicle, as shown in FIG. 1, the application scenario diagram depicts the application of the present application's technical solution in a vehicle's onboard system. During the driving of a vehicle 10, in order to avoid accidents caused by pedestrians or vehicles entering blind areas of the vehicle, such as blind areas of side mirrors, it is necessary to perform blind area detection on all blind areas of the vehicle to timely detect pedestrians or other vehicles within the blind areas. As shown in FIG. 1, targets 211 and 212 are traveling in a blind area 210 on the right side of the vehicle 10, while targets 311 and 312 are traveling in a blind area 310 on the left side of the vehicle 10. In order to ensure a safe distance between the vehicle 10 and the targets, and to avoid accidents, the blind area 210 can be monitored using a first camera 20 mounted on the right side of the vehicle 10, while the blind area 310 can be monitored using a second camera 30 mounted on the left side of the vehicle 10. By employing a target detection model, the real-time images captured by cameras 20 and 30 can be analyzed to detect targets (pedestrians or vehicles) within the blind areas, providing detection result for the blind area of the vehicle to assist a driver of the vehicle 10 or an autonomous driving program running in the onboard system in timely avoiding accidents.

Figure 2:
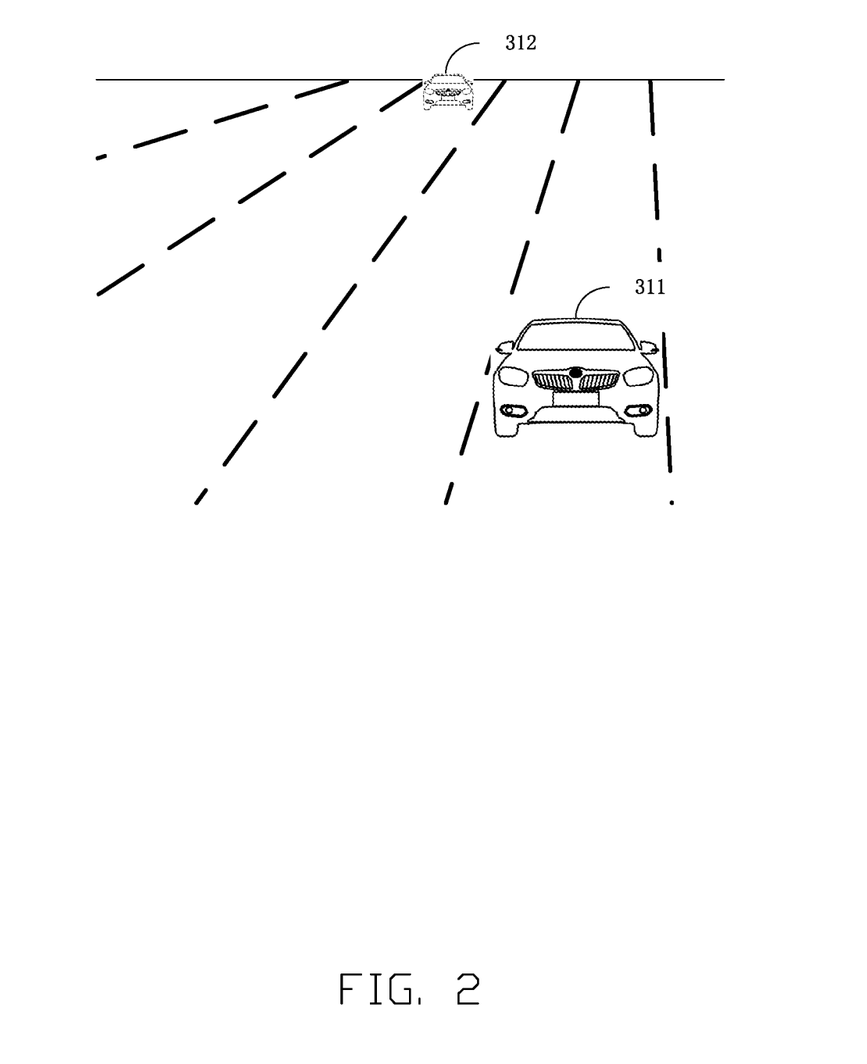
FIG. 2 is a schematic diagram of a blind area of the vehicle.

Under the same response time, the faster the vehicle's travels, the further the pedestrians or vehicles within the blind areas should be detected to allow sufficient reaction time for the driver to make corresponding judgments. FIG. 2 illustrates an imaging schematic of a blind area 310. Due to the characteristics of camera imaging, where objects appear larger when they are closer and smaller when they are farther, and the near region appears clearer while the distant region appears blurrier, and the image captured by camera 30 in monitoring blind area 310 shows that target 311 appears smaller and blurrier compared to target 312. As a result, existing blind area target detection methods may mistakenly classify target 311 when performing real-time image detection of blind area 310, leading to the inability to detect target 311 quickly and accurately, thus providing the driver insufficient available reaction time and reducing the safety of vehicle operation.

The target detection method for blind areas of a vehicle provided by the embodiment can be performed on one or more electronic devices. An electronic device is a device capable of automatically performing perform numerical calculation and/or information processing according to pre-set or stored instructions, and its hardware includes, but is not limited to, a microprocessor, an application specific integrated circuit (ASIC), a field-programmable gate array (FPGA), a digital signal processor (DSP), an embedded equipment, and so on.

The electronic device can be any electronic product that can interact with a user. For example, the electronic device can be a personal computer, a tablet computer, a smart phone, a personal digital assistant (PDA), a game console, and an internet protocol television (IPTV), a smart wearable device, etc.

The electronic device may also include network equipment and/or user equipment. Wherein, the network device includes, but is not limited to, a network server, a server group formed by a plurality of network servers, or a cloud formed by many hosts or network servers based on cloud computing.

The network where the electronic device is located includes, but is not limited to, the Internet, a wide area network, a metropolitan area network, a local area network, a virtual private network (VPN), and the like.

Figure 3:
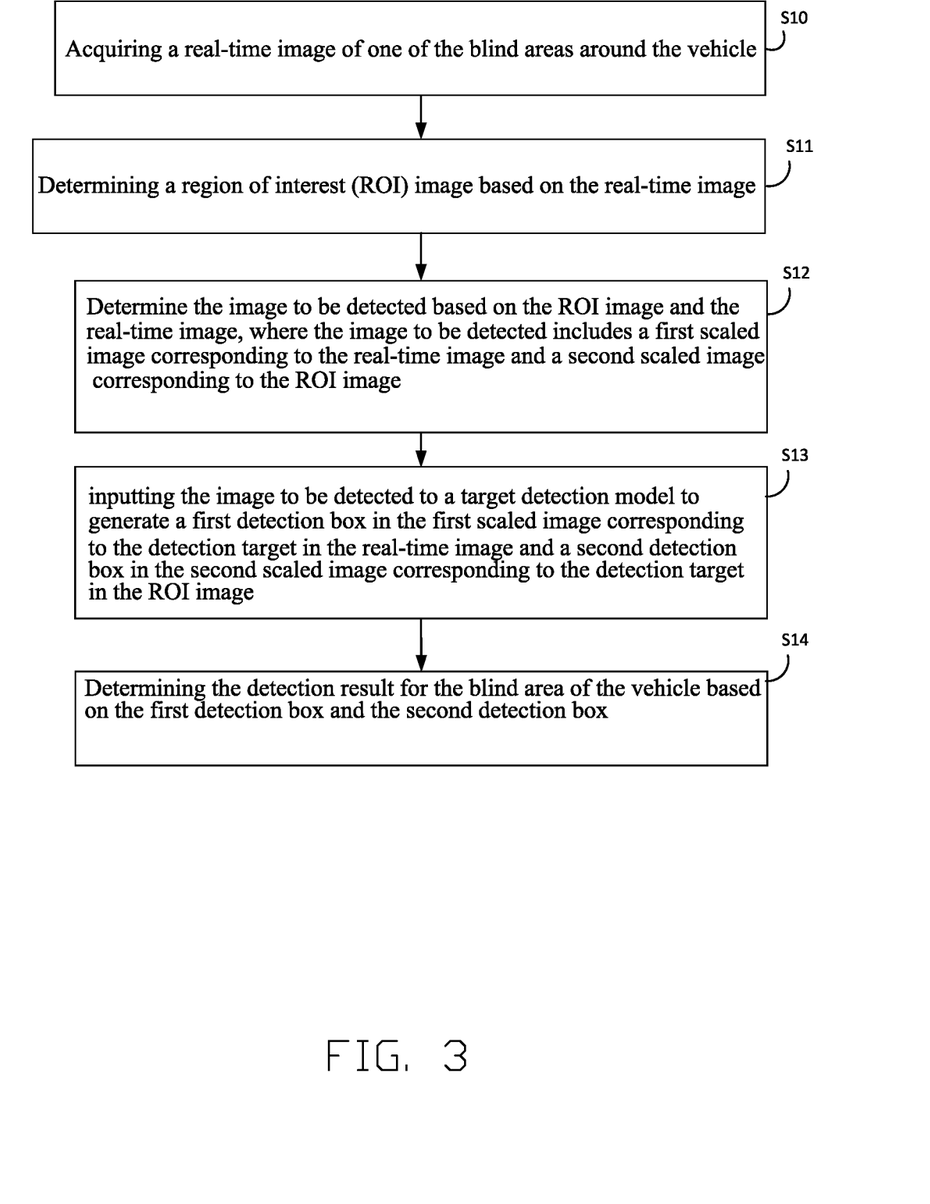
FIG. 3 illustrates a flowchart of an embodiment of the target detection method for blind areas of a vehicle according to the disclosure.

FIG. 3 illustrates a flowchart of an embodiment of the target detection method for blind areas of a vehicle. The method is provided by way of example, as there are a variety of ways to carry out the method. Each block shown in FIG. 3 represents one or more processes, methods, or subroutines carried out in the example method. Furthermore, the illustrated order of blocks is by example only and the order of the blocks can be changed. Additional blocks may be added, or fewer blocks may be utilized, without departing from this disclosure. According to different requirements, a sequence of each block in this flowchart can be adjusted according to actual requirements, and some blocks can be omitted.

The example method can begin at block S10.

At block S10, acquiring a real-time image of one of the blind areas of the vehicle, where the real-time image contains the detection target.

According to one embodiment, multiple cameras can be deployed around the vehicle to capture real-time images within the blind areas, which are then sent to the electronic device. The real-time images are captured by any of the cameras mounted around the vehicle, including cameras installed on the front, rear, and sides such as the side mirrors. There is at least one blind area of the vehicle, and the real-time images of each blind area are captured by the corresponding camera.

The real-time images contain detection targets, which include pedestrians, animals, vehicles, static obstacles, etc.

At block S11, determining a region of interest (ROI) image based on the real-time image.

In one embodiment, the ROI image represents image information of the region of interest in the real-time images. The region of interest can be a distant area from the vehicle reflecting the position of detection targets in a far area of the blind area. The region of interest can also be any pre-defined area in the real-time images that represents an area of interest within the blind area, such as areas near the edges of the blind area or areas near the vehicle in the blind area. The detection targets include pedestrians, animals, vehicles, static obstacles, etc.

In one embodiment, determining the ROI image based on the real-time images includes: determining the ROI in the real-time images based on pre-set vanishing points and predefined sizes; cropping the ROI to obtain the ROI image.

The vanishing point represents the disappearance position of the detection targets in the far distance of the real-time images. Since the position and angle of the blind area monitoring cameras deployed around the vehicle are fixed, the location of the vanishing point remains constant. Thus, a pixel in the real-time images can be marked as the vanishing point, for example, the disappearance position of lane lines from near to far can be marked as the vanishing point.

The predefined size refers to a pre-set rectangular size. A region satisfying the predefined size is cropped from the real-time images, with the vanishing point included in this region, resulting in the ROI image. Since the vanishing point is contained within the ROI and represents a pixel in the real-time images that represents a distant position, the ROI image can represent the image information of the distant area in the real-time images.

In at least one embodiment of the disclosure, the ROI can be directly determined in the real-time images based on the predefined size, and the image information of the region of interest is cropped to obtain the ROI image.

In this embodiment, the region of interest is used to represent any area in the real-time images that requires focused analysis. For example, the region of interest can be an area in the blind area that is close to the vehicle or an area near the edge of the blind area.

By cropping the ROI image that requires focused analysis from the real-time images, the receptive field within the blind area can be narrowed down, providing data support for subsequent construction of the image to be detected. As a result, the accuracy of target detection for blind areas of the vehicle can be improved.

At block S12, determining the image to be detected based on the ROI image and the real-time image, where the image to be detected includes a first scaled image corresponding to the real-time image and a second scaled image corresponding to the ROI image.

According to at least one embodiment, the first scaled image corresponding to the real-time image and the second scaled image corresponding to the ROI image are concatenated to form the image to be detected. Since the ROI image represents a portion of the image information in the real-time image, concatenating the first scaled image and the second scaled image adds multi-scale information to the image to be detected, thereby improving the accuracy of subsequent target detection. It also facilitates the use of a single target detection model in the subsequent target detection process, reducing model complexity and improving the efficiency of blind area target detection.

According to at least one embodiment, determining the image to be detected based on the ROI image and the real-time image includes: creating a background image that satisfies a predefined background size; acquiring the first scaled image by scaling the real-time image according to a predefined first scaling ratio and acquiring the second scaled image by scaling the ROI image according to a predefined second scaling ratio; and pasting the first scaled image and the second scaled image onto the background image to obtain the image to be detected.

In this embodiment, the predefined background size refers to a pre-set rectangular size, and the background image is a rectangular image that meets the predefined background size. The background image is an empty image that does not contain any image information.

In this embodiment, the predefined first scaling ratio is used to scale the size of the real-time image to obtain the first scaled image, which has the same image information as the real-time image but a different size from real-time image. The predefined second scaling ratio is used to scale the size of the ROI image to obtain the second scaled image with the same image information as the ROI image but a different size from the ROI image.

According to some embodiments, the predefined background size includes a predefined width and a predefined height. The predefined first scaling ratio can be determined as follows: when the predefined width is equal to the predefined height, either one can be used as a reference size. When the predefined width and the predefined height are not equal, the smaller value between them is used as the reference size. The reference size is used to calculate the first scaling ratio for scaling the real-time image, ensuring that the image to be detected can include all the pixel information from the real-time image. The scaling size is determined by taking the greater value between the width and height of the real-time image, and the first scaling ratio is calculated as the ratio between the reference size and the scaling size.

For example, when the width of the real-time image is 1920 pixels and the height is 1080 pixels, and the predefined first scaling ratio is set to 0.6, then the width of the first scaled image would be 1920*0.6=1152 pixels, and the height would be 1080*0.6=648 pixels. If the width and height of the ROI image are both 640 pixels, and the predefined second scaling ratio is set to 0.4, then the width of the second scaled image would be 640*0.4=256 pixels, and the height would also be 640*0.4=256 pixels.

In this embodiment, the first scaled image can be pasted onto the upper, lower, left, or right side of the background image. When pasted on the upper or lower side of the background image, the first scaled image and the second scaled image are arranged in the column direction within the background image. When pasted on the left or right side of the background image, the first scaled image and the second scaled image are arranged in the row direction within the background image.

According to at least one embodiment, the background image is divided into three regions: the first region, the second region, and the third region. The second region is located between the first region and the third region, where the first region is occupied by the first scaled image and the third region is occupied by the second scaled image.

In this embodiment, after pasting the first scaled image onto one side of the background image, the background image is divided into the first region, the second region, and the third region. The first region is occupied by the first scaled image, and the second region is located between the third region and the first region, serving as a separator between the first scaled image and the third region.

According to at least one embodiment, the second scaling factor can be calculated based on the third region and the ROI image. Specifically, the calculation involves determining the height ratio between the third region and the ROI image, as well as the width ratio between the third region and the ROI image. The smaller value between the height ratio and the width ratio is chosen as the second scaling factor. This ensures that the second scaled image can be pasted into the third region.

For example, if the width of the third region is 1920 pixels and the height is 324 pixels, and the width and height of the ROI image are both 1920 pixels and 648 pixels respectively, the height ratio between the third region and the ROI image would be 324/648=0.5, and the width ratio would be 1. Therefore, the second scaling factor can be set as 0.5.

According to at least one embodiment, after obtaining the second scaling factor, the ROI image is scaled based on this factor to obtain the second scaled image. The second scaled image is then pasted into the third region, resulting in an image to be detected that satisfies the predetermined size. The first scaled image, the second region, and the second scaled image together completely fill the background image. Both the second region and the third region are rectangular areas. The image to be detected consists of the first scaled image corresponding to the real-time image, the second scaled image corresponding to the ROI image, and the second region located between the first scaled image and the second scaled image.

Figure 4:
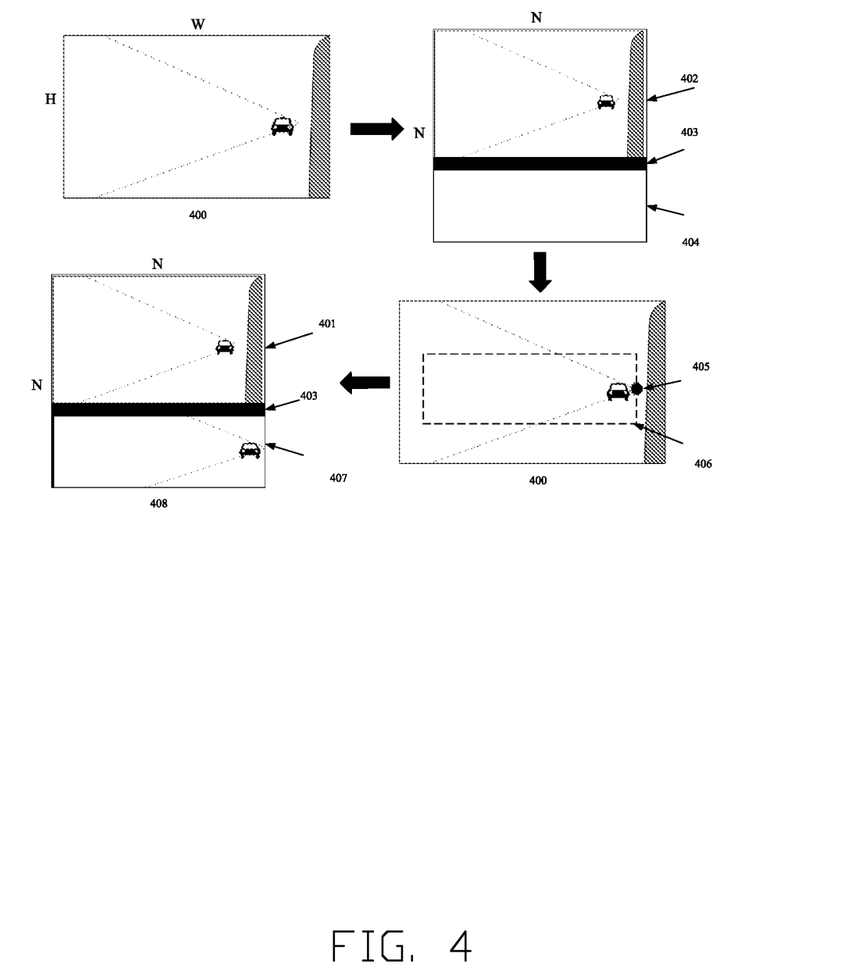
FIG. 4 is a schematic structural diagram of an embodiment of determining the image to be detected.

For example, FIG. 4 shows the real-time image 400 captured by the camera of the left-side mirror as an example. Assuming the predetermined width and height are both N, and the width W of the real-time image is greater than the height H, the background image is a square with dimensions N×N. In this case, the first scaling factor is N/W, the real-time image 400 is scaled based on the first scaling factor N/W, and the resulting first scaled image 401 is pasted at the top of the background image. The first scaled image 401 occupies the first region 402 in the background image. Furthermore, the pixels in the predetermined number of rows adjacent to the first scaled image 401 in the background image are divided into the second region 403, while the remaining area in the background image, excluding the second region and the first scaled image, becomes the third region 404. The center point of the height in the third region 404 coincides with the vanishing point 405 in the real-time image 400 to create the ROI, the image information within the ROI is cropped from the real-time image 400, resulting in the ROI image 406. Then, based on the third region 404 and the ROI image 406, the second scaling factor is calculated. The ROI image 406 is scaled by using the second scaling factor to obtain the second scaled image 407, which is then pasted into the third region 403 to obtain an image to be detected 408 with dimensions N×N.

According to another embodiment, the ROI can be constructed based on the vanishing point in the real-time image and a pre-defined ROI size, and the ROI image can be obtained by cropping the real-time image based on the ROI. The ROI represents the region in the real-time image that is farther away from the vehicle.

Figure 5:
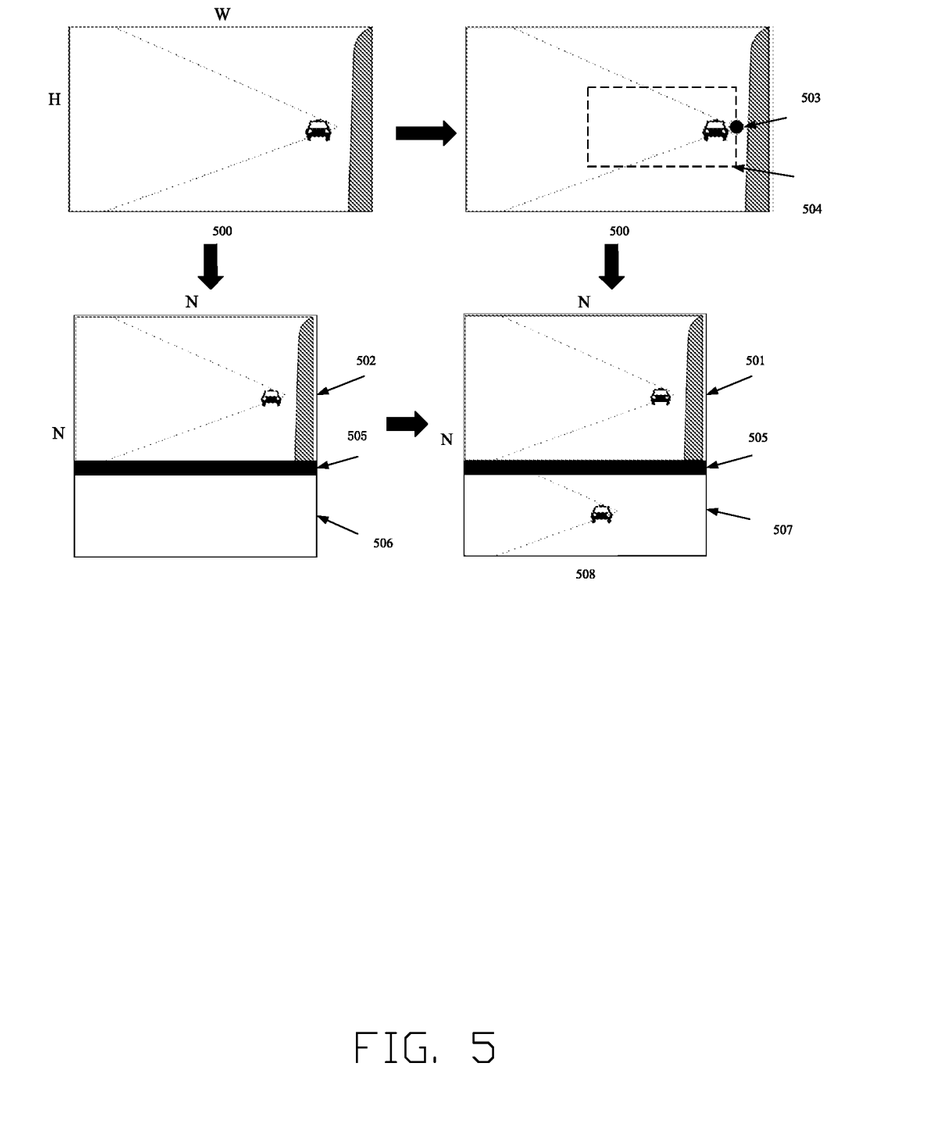
FIG. 5 is a schematic structural diagram of another embodiment of determining the image to be detected.

For example, FIG. 5 shows the real-time image 500 captured by the camera of the left-side mirror. Assuming the predetermined width and height are both N, and the width W of the real-time image is greater than the height H, the background image is a square with dimensions N×N. The real-time image 500 is scaled based on the first scaling factor N/W, and the resulting first scaled image 501 is pasted at the top of the background image. The first scaled image 501 occupies the first region 502 in the background image. Simultaneously, the center point of height of the pre-defined ROI size coincides with the vanishing point 503 in the real-time image to construct the ROI. The real-time image is cropped based on the ROI to obtain the ROI image 504. Furthermore, the pixels in a predetermined number of rows adjacent to the first scaled image 501 in the background image are divided into the second region 505, while the remaining area in the background image, excluding the second region and the first scaled image, becomes the third region 506. Further, based on the third region 506 and the ROI image 504, the second scaling factor is calculated. The ROI image 504 is scaled by the second scaling factor to obtain the second scaled image 507, which is then pasted into the blank area to obtain an image to be detected 508 with dimensions N×N.

Therefore, an image to be detected that satisfies the predetermined size is obtained. The image to be detected includes real-time images and ROI images with different scaling factors, and there is a reduced region between real-time images and ROI images. This provides support for subsequently selecting detection boxes that span both the real-time images and ROI images, thereby improving the accuracy of blind area target detection.

At block S13: inputting the image to be detected to a target detection model to generate a first detection box in the first scaled image corresponding to the detection target in the real-time image and a second detection box in the second scaled image corresponding to the detection target in the ROI image.

According to at least one embodiment, the target detection model is utilized to perform a detection on the image to be detected, obtaining two types of detection boxes corresponding to the first scaled image and the second scaled image, namely the first detection box and the second detection box. This enhances the efficiency of blind area target detection and provides data support for subsequent filtering of detection result for the blind area of the vehicle based on the two types of detection boxes, thereby improving the accuracy of detection result for the blind area of the vehicle.

According to at least one embodiment, the target detection model can be any existing target detection model such as YOLOv3, CenterNet, etc., which is not limited in this disclosure. The image to be detected is input to the target detection model, and the target detection model outputs the first detection box in the first scaled image in the real-time image and a second detection box in the second scaled image corresponding to the detection target in the ROI image. Either the first detection box or second detection box is a rectangular box surrounding the detection target, and either the first or second detection box corresponds to a confidence level in a range from 0 to 1.

In this embodiment, the predetermined size of the image to be detected is related to the target detection model. The predetermined size includes the predetermined width and predetermined height, which may be the same or different.

For example, when the input image dimensions of the target detection model are 1920*1080 pixels, the predetermined width of the image to be detected is 1920 pixels, and the predetermined height is 1080 pixels. Another example is when the input image dimensions of the target detection model are 600*600 pixels, both the predetermined width and predetermined height of the image to be detected are 600 pixels.

At block S14: determining the detection result for the blind area of the vehicle based on the first detection box and the second detection box.

According to at least one embodiment, the detection result for the blind area of the vehicle can be determined based on the first detection box and the second detection box to eliminate false positives in the detection result for the blind area of the vehicle, thus improving the accuracy of detection result for the blind area of the vehicle.

According to at least one embodiment, determining the detection result for the blind area of the vehicle based on the first detection box and the second detection box includes the following steps: projecting the first detection box onto the real-time image, and projecting the second detection box onto the ROI image; calculating an overlap value between a first projection of the first detection box on the real-time image and a second projection of the second detection box on the ROI image; filtering the first projection and the second projection based on the overlap value to obtain the detection result for the one of the blind areas of the vehicle.

In this embodiment, the first detection box can be projected onto the real-time image based on the first scaling ratio. Similarly, the second detection box can be projected onto the ROI image based on the second scaling ratio.

For example, in cases that the first scaling ratio is ½, the real-time image is scaled down by ½ to obtain the first scaled image. Conversely, the first detection box A can be projected onto the real-time image by scaling up the first detection box A in the first scaled image by 2 times. By applying the same method to all the first and second detection boxes in the image to be detected, the first detection boxes can be projected onto the real-time image, and the second detection boxes can be projected onto the ROI image.

By projecting the detection boxes in the image to be detected onto the ROI image or the real-time image, it is possible to obtain the detection boxes of all detection targets in both the ROI image and the real-time image simultaneously through one single inference of target detection. This improves the detection speed. Furthermore, since the scaling ratios of the ROI image and the real-time image in the image to be detected are different, it enables detection at different scales and improves the detection accuracy.

According to at least one embodiment, calculating an overlap value between the first projection of the first detection box on the real-time image and the second projection of the second detection box on the ROI image includes the following steps: restoring the ROI image to the ROI in the real-time image; calculating the intersection-over-union (IoU) between the first projection and the second projection; and setting the IoU as the overlap value.

After projecting each detection box onto the ROI image or the real-time image, the ROI image is aligned with the corresponding area in the real-time image to restore the ROI image to the ROI in the real-time image. For each detection target, the IoU between the first projection and the second projection is calculated and set as the overlap value.

For example, for a particular detection target, suppose the area of the second detection box in the ROI image is 30×30 pixels, and the area of the first detection box in the real-time image is also 30×30 pixels. After aligning the ROI image and the corresponding area in the real-time image, if the intersection area between the second detection box and the first detection box is 10×10 pixels, the formular of calculation of the IoU for the first and second detection boxes of the corresponding detection target is:

$$IoU = (10 \times 10)/((30 \times 30) + (30 \times 30)) = 0.05.$$

According to at least one embodiment, since the ROI image is obtained by cropping the real-time image based on the ROI, the real-time image includes all detection targets within the ROI. It should be noticed that, in an ideal scenario, all second detection boxes in the ROI image should perfectly align with the first detection boxes in the real-time image. Therefore, the second detection boxes in the ROI image can be filtered based on their overlap value with the corresponding first detection boxes in both the ROI image and the real-time image to further improve the detection accuracy.

According to at least one embodiment, filtering the first projection and the second projection based on the overlap value to obtain the detection result for the blind area of the vehicle includes following steps: for any detection box within the ROI of the real-time image, filtering the first projections based on their corresponding overlap and confidence score to obtain the first detection result for the blind area of the vehicle; for each detection box outside the ROI of the real-time image, comparing the confidence score of the detection box with a predefined confidence score, if the confidence score is greater than the predefined confidence score, retain the detection box, continue this process until all detection boxes outside the ROI have been traversed, and consider the retained detection boxes as the second detection result for the blind area of the vehicle; combining the first detection result for the blind area of the vehicle and the second detection result for the blind area of the vehicle to obtain the detection result for the blind area of the vehicle.

In this process, the predefined confidence threshold can be set to 0.5.

According to at least one embodiment, for any detection box projected on the ROI of the real-time image, filtering the first projections based on their corresponding overlap and confidence score to obtain the first detection result for the blind area of the vehicle includes following steps: deleting the detection box if the overlap of the projection of the detection box is not greater than a predefined overlap threshold; retaining the detection box as part of the first detection result for the blind area of the vehicle if the overlap of the projection of the detection box is greater than the predefined overlap threshold and the confidence score of the detection box is greater than the confidence value.

In this process, the predefined overlap threshold can be set to 0.5.

In this embodiment, the real-time image also includes detection boxes whose projections are outside the ROI. When the ROI includes the vanishing point in the field of view, the ROI represents the area in the real-time image that is further away from the vehicle. Therefore, the detection boxes whose projections are outside the ROI can be considered as representing detection targets in the nearer region of the real-time image. These detection boxes whose projections are outside the ROI can be labeled as "nearby detection boxes". Since the features of detection targets closer to the vehicle are more pronounced, the nearby detection boxes can be filtered by using only the confidence score. If the confidence score of any nearby detection box is greater than the predefined confidence threshold, the box is retained. If the confidence score of any nearby detection box is not greater than the confidence threshold, the box is deleted. After traversing all the nearby detection boxes, the retained nearby detection boxes in the real-time image are considered as the second detection result for the blind area of the vehicle.

Finally, the first detection result for the blind area of the vehicle and the second detection result for the blind area of the vehicle are combined to obtain the overall detection result for the blind area of the vehicle.

By filtering all detection boxes based on their confidence scores and overlap values, the detection accuracy is improved, both the detection targets closer to the vehicle in the real-time image and those further away can be identified.

According to at least one embodiment, before determining the detection result for the blind area of the vehicle based on the first detection box and the second detection box, the method further includes the following steps: removing the first detection box if there is an intersection between the first detection box and the second region; removing the second detection box if there is an intersection between the second detection box and the second region.

Figure 6:
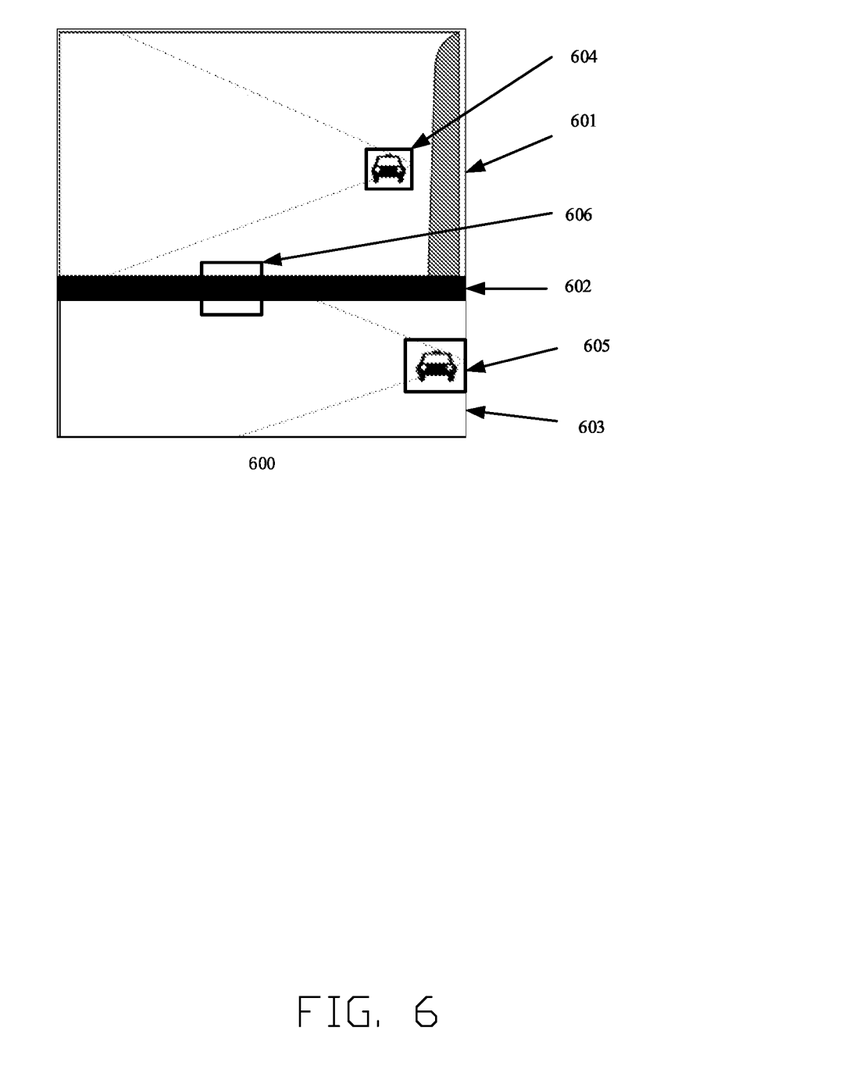
FIG. 6 is a schematic structural diagram of an embodiment of an abnormal detection box.

As shown in FIG. 6, in the image to be detected 600, the second region 602 is located between the first scaled image 601 and the second scaled image 603, and there are no detection targets within the second region 602, if any detection box (e.g., an abnormal detection box 606 in FIG. 6) intersects with the second region 602, it indicates that the detection box spans across the first scaled image 601 and the second scaled image 602. Therefore, this detection box is considered an abnormal detection box. There is no intersection between the first detection box 604 in the first scaled image 601 and the second region 602, and there is no intersection between the second detection box 605 in the second scaled image 605 and the second region 602, thus the first detection box 604 and the second detection box 605 are normal detection boxes. Then the abnormal detection box 606 can be removed, the first detection box 604 and the second detection box 605 can be remained, which reduces false positives in the target detection results.

Therefore, abnormal detection boxes can be filters out by checking the intersection between the detection boxes and the second region of the image to be detected before obtaining the detection result for the blind area of the vehicle, which improves the accuracy of detection result for the blind area of the vehicle.

The disclosure acquires real-time images of any blind area and crops the predefined ROI from the real-time image to obtain the ROI image. Furthermore, the ROI image and the real-time image are scaled at different ratios and sliced together to form an image to be detected of the predefined size. Then input the image to be detected into the target detection model and the target detection model can output the detection result for the blind area of the vehicle. Therefore, the detection boxes for all detection targets in both the ROI image and the real-time image at different scales can be obtained by performing target detection on the ROI image and the real-time image at the same time, thereby improving detection speed and accuracy. Additionally, by filtering the detection boxes based on the overlap values of their projections on the ROI image and the real-time image, the abnormal detection box can be removed to reduce false positives in the target detection results, which further improves detection accuracy. Consequently, this enables the rapid and accurate detection of detection targets within the vehicle blind area, providing the driver with sufficient reaction time to make appropriate judgments.

Figure 7:
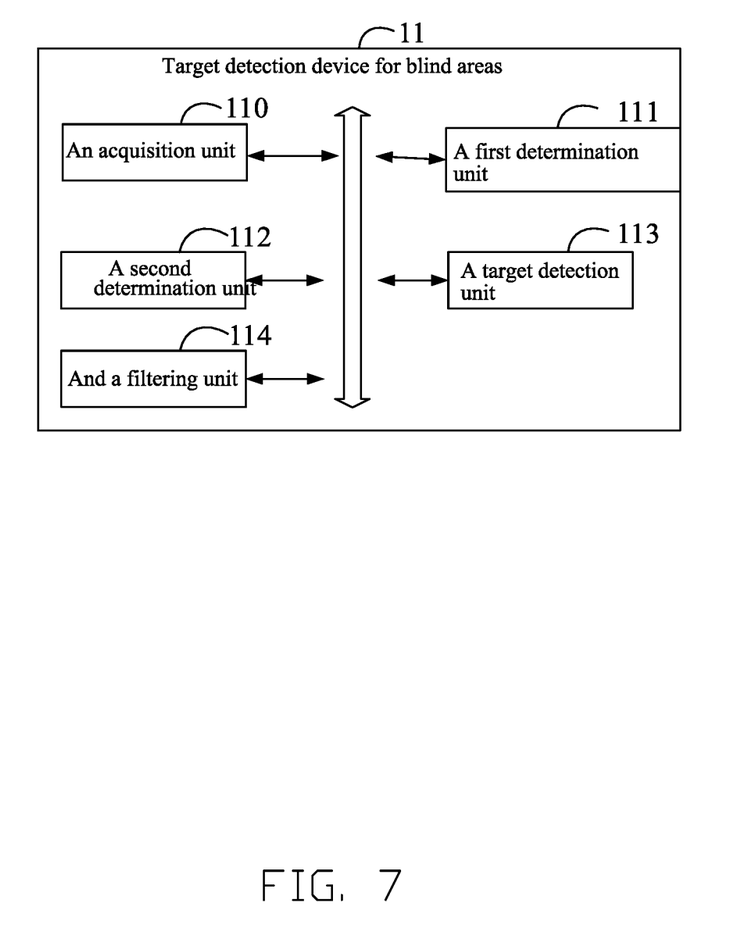
FIG. 7 is a schematic structural diagram of an embodiment of a vehicle blind area target detection device provided by the disclosure.

Refer to FIG. 7, a functional block diagram of an embodiment of a vehicle blind area target detection device described in the present application is illustrated. The vehicle blind area target detection device 11 includes an acquisition unit 110, a first determination unit 111, a second determination unit 112, a target detection unit 113, and a filtering unit 114. The term "module/unit" as referred to in this application denotes a series of computer-readable instruction segments that can be executed by a processor 13, capable of performing specific functions, and stored in the storage device 12. The functionalities of the various modules/units will be described in detail in subsequent embodiments.

The acquisition unit 110 acquires a real-time image of one of the blind areas of the vehicle.

The first determination unit 111 determines ROI image based on the real-time image.

The second determination unit 112 determines an image to be detected based on the ROI image and the real-time image. The image to be detected includes a first scaled image corresponding to the real-time image and a second scaled image corresponding to the ROI image.

The target detection unit 113 inputs the image to be detected into a target detection model, which generates a first detection box in the first scaled image corresponding to the detection target in the real-time image and a second detection box in the second scaled image corresponding to the detection target in the ROI image.

The filtering unit 114 determines detection result for the blind area of the vehicle based on the first detection boxes and the second detection boxes.

According to at least one embodiment, the first determination unit 111 is specifically used for: determining the ROI in the real-time image based on the predefined vanishing point and the predefined size; cropping the ROI to obtain the ROI image.

Alternatively, the second determination unit 112 is specifically used for: creating a background image that satisfies a predefined background size; obtain the first scaled image by scaling the real-time image according to a predefined first scaling ratio and obtain the second scaled image by scaling the ROI image according to a predefined second scaling ratio; pasting the first scaled image and the second scaled image onto the background image to obtain the image to be detected.

Alternatively, the background image consists of a first region, a second region, and a third region. The second region is located between the first region and the third region, where the first region is occupied by the first scaled image, and the third region is occupied by the second scaled image.

Alternatively, before determining the detection result for the blind area of the vehicle based on the first detection boxes and the second detection boxes, the filtering unit 114 also performs the following operations: removing the first detection box if there is an intersection between the first detection box and the second region; remove the second detection box if there is an intersection between the second detection box and the second region.

Alternatively, the filtering unit 114 specifically performs the following operations: projecting the first detection box onto the real-time image, and projecting the second detection box onto the ROI image; calculating an overlap value between a first projection of the first detection box in the real-time image and a second projection of the second detection box in the ROI image; filtering the first detection box and the second detection box based on the overlap value to obtain the detection result for the blind area of the vehicle.

Alternatively, the filtering unit 114 further performs the following operations: restoring the ROI image to the ROI in the real-time image; calculating the intersection-over-union (IoU) between the first projection and the second projection, and setting the IoU as the overlap value.

The disclosure acquires real-time images of any blind area and crops the predefined ROI from the real-time image to obtain the ROI image. Furthermore, the ROI image and the real-time image are scaled at different ratios and sliced together to form an image to be detected of the predefined size. Then input the image to be detected into the target detection model and the target detection model can output the detection result for the blind area of the vehicle. Therefore, all detection boxes for the detection target in both the ROI image and the real-time image at different scales can be obtained by performing target detection on the ROI image and the real-time image at the same time, thereby improving detection speed and accuracy. Additionally, by filtering the detection boxes based on the overlap value of their projections on the ROI image and the real-time image, the abnormal detection box can be removed to reduce false positives in the target detection results, which further improves detection accuracy. Consequently, this enables the rapid and accurate detection of detection targets within the vehicle blind area, providing the driver with sufficient reaction time to make appropriate judgments.

Figure 8:
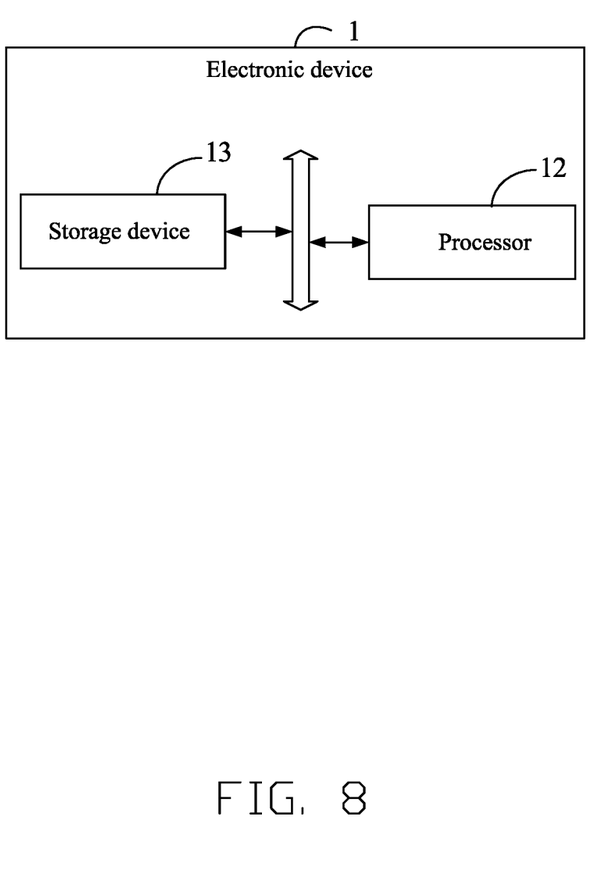
FIG. 8 is a schematic structural diagram of an embodiment of an electronic device provided by the disclosure.

Refer to FIG. 8, a schematic diagram of an electronic device according to an embodiment of the disclosure is illustrated. The electronic device 1 includes a storage device 12 and a processor 13. The storage device 12 is used to store computer-readable instructions, and the processor 13 is used to execute the computer-readable instructions stored in the storage device 12 to implement the target detection method for blind areas of a vehicle described in any of the embodiments mentioned above.

According to at least one embodiment, the electronic device 1 further includes a bus and a computer program stored in the storage device 12 that can run on the processor 13, such as the vehicle blind area target detection program.

FIG. 8 only illustrates the electronic device 1 with the storage device 12 and the processor 13. It should be understood by those skilled in the art that the structure shown in FIG. 8 does not limit the electronic device 1 and may include fewer or more components, or a combination of certain components, or a different arrangement of components.

Referring to FIG. 1 and FIG. 8, the storage device 12 in the electronic device 1 stores multiple computer-readable instructions to implement a target detection method for blind areas of a vehicle, and the processor 13 can execute these multiple instructions to achieve the following: acquire a real-time image of one of the blind areas of the vehicle; determine a ROI image based on the real-time image; determine the image to be detected based on the ROI image and the real-time image, where the image to be detected includes a first scaled image corresponding to the real-time image and a second scaled image corresponding to the ROI image; input the image to be detected to the target detection model, which generates a first detection box in the first scaled image corresponding to the detection target and a second detection box in the second scaled image corresponding to the detection target; determine the blind area detection result based on the first detection boxes and the second detection boxes.

Refer to FIG. 8, a schematic diagram of an electronic device according to an embodiment of the disclosure is illustrated. The electronic device 1 includes a storage device 12 and a processor 13. The storage device 12 is used to store computer-readable instructions, and the processor 13 is used to execute the computer-readable instructions stored in the memory to implement the target detection method for blind areas of a vehicle described in any of the embodiments mentioned above.

According to at least one embodiment, the electronic device 1 further includes a bus and a computer program stored in the storage device 12 that can run on the processor 13, such as the vehicle blind area target detection program.

FIG. 8 only illustrates the electronic device 1 with the storage device 12 and the processor 13. It should be understood by those skilled in the art that the structure shown in FIG. 8 does not limit the electronic device 1 and may include fewer or more components, or a combination of certain components, or a different arrangement of components.

Referring to FIG. 1, the storage device 12 in the electronic device 1 stores multiple computer-readable instructions to implement a target detection method for blind areas of a vehicle, and the processor 13 can execute these multiple instructions to achieve the following: acquiring real-time images of any blind area of the vehicle; determine the ROI image based on the real-time image; determining the image to be detected based on the ROI image and the real-time image, where the image to be detected includes a first scaled image corresponding to the real-time image and a second scaled image corresponding to the ROI image; inputting the image to be detected to the target detection model, which generates a first detection box in the first scaled image corresponding to the detection target and a second detection box in the second scaled image corresponding to the detection target; determining the detection result for the blind area of the vehicle based on the first detection boxes and the second detection boxes.

Specifically, the processor 13 can refer to the description of the corresponding steps in the embodiment shown in FIG. 1 for the specific implementation of the above instructions, which will not be repeated here.

It will be understood by those skilled in the art that the schematic diagram is merely an example of the electronic device 1 and does not limit the electronic device 1. The electronic device 1 can have a bus-type structure or a star-type structure. The electronic device 1 may also include other hardware or software components, more or fewer than those shown in the diagram, or a different arrangement of components. For example, the electronic device 1 may include input/output devices, network access devices, and so on.

It should be noted that the electronic device 1 is just an example, and other existing or future electronic products that are adaptable to the present application should also be included within the scope of protection of the present application and incorporated herein by reference.

The storage device 12 includes at least one type of readable storage medium, which can be non-volatile or volatile. The readable storage medium includes flash memory, hard disk, multimedia card, card-type storage (such as SD or DX memory), magnetic storage, disk, optical disc, and so on. In some embodiments, the storage device 12 can be an internal storage unit of the electronic device 1, such as the mobile hard disk of the electronic device 1. In other embodiments, the storage device 12 can also be an external storage device of the electronic device 1, such as a plug-in mobile hard disk, smart media card (SMC), secure digital (SD) card, flash card, etc., equipped on the electronic device 1. The storage device 12 can be used not only to store application software and various types of data installed in the electronic device 1, such as the code of the vehicle blind area target detection program, but also to temporarily store data that has been output or will be output.

The processor 13 can be composed of integrated circuits. For example, it can be composed of a single packaged integrated circuit or multiple integrated circuits with the same or different functions, including one or more central processing units (CPUs), microprocessors, digital processing chips, graphics processors, and various combinations of control chips. The processor 13 is the control unit of the electronic device 1, connecting various components of the electronic device 1 through various interfaces and lines. It runs or executes programs or modules (such as the vehicle blind area target detection program) stored in the storage device 12 and calls data stored in the storage device 12 to perform various functions of the electronic device 1 and process data.

The processor 13 executes the operating system and various installed applications of the electronic device 1. It executes the applications to implement the steps of various target detection method for blind areas of a vehicle embodiments mentioned above, such as the steps shown in FIG. 3.

The computer program can be divided into one or more modules/units, which are stored in the storage device 12 and executed by the processor 13 to complete the present application. The one or more modules/units may be a series of computer-readable instruction segments capable of performing specific functions, and the instruction segments are used to describe the process of acquisition the computer program in the electronic device 1. For example, the computer program can be divided into acquisition unit 110, stitching unit 111, detection unit 112, calculation unit 113, and filtering unit 114.

The integrated units implemented in the form of software functional modules can be stored in a computer-readable storage medium. The software function modules stored in a storage medium include several instructions to enable a computer device (such as a personal computer, computing device, or network device) or a processor to execute parts of the target detection method for blind areas of a vehicle described in various embodiments of the present application.

If the modules/units integrated in the electronic device 1 are implemented in the form of software functional units and sold or used as independent products, they may be stored in a computer-readable storage medium. Based on this understanding, the disclosure can implement all or part of the processes in the methods of the above embodiments, and can also be completed by instructing the relevant hardware through a computer program. The computer program can be stored in a computer-readable storage medium, and when the computer program is acquired by the processor, the blocks of the foregoing method embodiments can be implemented.

Wherein, the computer program includes computer program code, and the computer program code may be in the form of source code, object code, obtainable file or some intermediate form, and the like. The computer-readable medium may include: any entity or device capable of carrying the computer program code, recording medium, U disk, removable hard disk, magnetic disk, optical disk, computer memory, read-only memory (ROM).

Furthermore, the computer-readable storage medium mainly includes a program storage area and a data storage area. The program storage area can store an operating system, at least one application required for a specific function, and so on. The data storage area can store data created based on the use of blockchain nodes.

The bus can be a Peripheral Component Interconnect (PCI) bus, an Extended Industry Standard Architecture (EISA) bus, or bus of other interconnection standards. The bus can be divided into address bus, data bus, control bus, etc. For ease of representation, only one arrow is shown in FIG. 8, but it does not mean that there is only one bus or one type of bus. The bus is configured to establish communication connections between the storage device 12, at least one processor 13, and other components.

In addition, the embodiments of the present application also provide a computer-readable storage medium (not shown in the FIG.) that stores computer-readable instructions. The computer-readable instructions are executed by the processor in the electronic device to implement the target detection method for blind areas of a vehicle described in any of the embodiments mentioned above.

In several embodiments provided in the present application, it should be understood that the disclosed systems, devices, and methods can be implemented in other ways. For example, the described device embodiments are only illustrative, and the division of modules is for logical functional division. In actual implementation, there may be different division methods.

In addition, each functional unit in each embodiment of the disclosure can be integrated into one processing unit, or can be physically present separately in each unit, or two or more units can be integrated into one unit. The above integrated unit can be implemented in a form of hardware or in a form of a software functional unit.

While the invention has been described in detail in connection with only a limited number of embodiments, it should be readily understood for the skilled in the art that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A target detection method for blind areas of a vehicle, comprising:
    acquiring a real-time image of one of the blind areas of the vehicle;
    determining a region of interest (ROI) image based on the real-time image;
    determining an image to be detected based on the ROI image and the real-time image, comprising: creating a background image satisfying a predefined background size, acquiring a first scaled image by scaling the real-time image according to a predefined first scaling ratio and acquiring a second scaled image by scaling the ROI image according to a predefined second scaling ratio, and pasting the first scaled image and the second scaled image onto the background image to determine the image to be detected, and the image to be detected is provided with the first scaled image corresponding to the real-time image and the second scaled image corresponding to the ROI image;
    inputting the image to be detected into a target detection model to generate a first detection box in the first scaled image corresponding to a detection target in the real-time image and a second detection box in the second scaled image corresponding to the detection target in the ROI image; and
    determining a detection result for the one of the blind areas of the vehicle based on the first detection box and the second detection box.

2. The method of claim 1, wherein determining a ROI image based on the real-time image further comprises:
    determining a ROI in the real-time image based on a pre-set vanishing point and a predefined size, the pre-set vanishing point represents a disappearance position of the detection target in a far distance of the real-time image, the predefined size is a pre-set rectangular size, and
    cropping the ROI to obtain the ROI image.

3. The method of claim 1, wherein the background image is divided into a first region, a second region, and a third region,
    the second region is located between the first region and the third region,
    the first region is occupied by the first scaled image, and
    the third region is occupied by the second scaled image.

4. The method of claim 3, before determining the detection result for the blind area of the vehicle based on the first detection box and the second detection box, the method further comprising:
    removing the first detection box if there is an intersection between the first detection box and the second region; and
    removing the second detection box if there is an intersection between the second detection box and the second region.

5. The method of claim 1, wherein determining the detection result for the blind area of the vehicle based on the first detection box and the second detection box further comprises:
    projecting the first detection box onto the real-time image and projecting the second detection box onto the ROI image,
    calculating an overlap value between a first projection of the first detection box on the real-time image and a second projection of the second detection box on the ROI image, and
    filtering the first projection and the second projection based on the overlap value to obtain the detection result for the one of the blind areas of the vehicle.

6. The method of claim 5, wherein calculating the overlap value between the first projection of the first detection box on the real-time image and the second projection of the second detection box on the ROI image further comprises:
    restoring the ROI image to the ROI in the real-time image,
    calculating an intersection-over-union (IoU) between the first projection and the second projection, and
    setting the IoU as the overlap value.

7. A target detection device for blind areas of a vehicle, comprising:
    an acquisition unit that acquires a real-time image of one of the blind areas of the vehicle;
    a first determination unit that determines a region of interest (ROI) image based on the real-time image;
    a second determination unit that determines an image to be detected based on the ROI image and the real-time image, comprising: creating a background image satisfying a predefined background size, acquiring a first scaled image by scaling the real-time image according to a predefined first scaling ratio and acquiring a second scaled image by scaling the ROI image according to a predefined second scaling ratio, and pasting the first scaled image and the second scaled image onto the background image to determine the image to be detected, and the image to be detected comprises the first scaled image corresponding to the real-time image and the second scaled image corresponding to the ROI image;
    a target detection unit that inputs the image to be detected into a target detection model to generate a first detection box in the first scaled image corresponding to a detection target in the real-time image and a second detection box in the second scaled image corresponding to the detection target in the ROI image, and a filtering unit that determines a detection result for the one of the blind areas of the vehicle based on the first detection box and the second detection box.

8. An electronic device comprising:
at least one processor; and
a storage device coupled to the at least one processor and storing computer-readable instructions for execution by the at least one processor to cause the at least one processor to implement following processes:
acquiring a real-time image of a blind area of a vehicle;
determining a region of interest (ROI) image based on the real-time image;
determining an image to be detected based on the ROI image and the real-time image, comprising: creating a background image satisfying a predefined background size, acquiring a first scaled image by scaling the real-time image according to a predefined first scaling ratio and acquiring a second scaled image by scaling the ROI image according to a predefined second scaling ratio, and pasting the first scaled image and the second scaled image onto the background image to determine the image to be detected, and the image to be detected comprises the first scaled image corresponding to the real-time image and the second scaled image corresponding to the ROI image;
inputting the image to be detected into a target detection model, to generate a first detection box in the first scaled image corresponding to a detection target in the real-time image and a second detection box in the second scaled image corresponding to the detection target in the ROI image; and
determining a detection result for the one of the blind areas of the vehicle based on the first detection box and the second detection box.

9. The electronic device according to claim 8, wherein the at least one processor determines the ROI image based on the real-time image by:
determining a ROI in the real-time image based on a pre-set vanishing point and a predefined size, the pre-set vanishing point represents a disappearance position of the detection target in a far distance of the real-time image, the predefined size is a pre-set rectangular size, and
cropping the ROI to obtain the ROI image.

10. The electronic device according to claim 8, wherein the background image is divided into a first region, a second region, and a third region,
the second region is located between the first region and the third region,
the first region is occupied by the first scaled image, and the third region is occupied by the second scaled image.

11. The electronic device according to claim 10, before determining the detection result for the blind area of the vehicle based on the first detection box and the second detection box, the at least one processor is further caused to implement following processes:
removing the first detection box if there is an intersection between the first detection box and the second region; and
removing the second detection box if there is an intersection between the second detection box and the second region.

12. The electronic device according to claim 8, wherein the at least one processor determines the detection result for the blind area of the vehicle based on the first detection box and the second detection box by:

projecting the first detection box onto the real-time image, and projecting the second detection box onto the ROI image,
calculating an overlap value between a first projection of the first detection box on the real-time image and a second projection of the second detection box on the ROI image, and
filtering the projection and the second projection based on the overlap value to obtain the detection result for the one of the blind areas of the vehicle.

13. The electronic device according to claim 12, wherein the at least one processor calculates the overlap value between the first projection of the first detection box on the real-time image and the second projection of the second detection box on the ROI image further comprises:
restoring the ROI image to the ROI in the real-time image,
calculating an intersection-over-union (IoU) between the first projection and the second projection, and
setting the IoU as the overlap value.

14. A non-transitory computer-readable storage medium having instructions stored thereon, when the instructions are executed by a processor of an electronic device, the processor is configured to perform a target detection method for blind areas of a vehicle, wherein the target detection method comprises:
acquiring a real-time image of one of the blind areas of the vehicle,
determining a region of interest (ROI) image based on the real-time image,
determine an image to be detected based on the ROI image and the real-time image, comprising: creating a background image satisfying a predefined background size, acquiring a first scaled image by scaling the real-time image according to a predefined first scaling ratio and acquiring a second scaled image by scaling the ROI image according to a predefined second scaling ratio, and pasting the first scaled image and the second scaled image onto the background image to determine the image to be detected, the image to be detected comprises the first scaled image corresponding to the real-time image and the second scaled image corresponding to the ROI image,
inputting the image to be detected into a target detection model, to generate a first detection box in the first scaled image corresponding to a detection target in the real-time image and a second detection box in the second scaled image corresponding to the detection target in the ROI image, and
determining a detection result for the one of the blind areas of the vehicle based on the first detection box and the second detection box.

15. The non-transitory computer-readable storage medium of claim 14, wherein determining the ROI image based on the real-time image further comprises:
determining a ROI in the real-time image based on a pre-set vanishing point and a predefined size, the pre-set vanishing point represents a disappearance position of the detection target in a far distance of the real-time image, the predefined size is a pre-set rectangular size, and
cropping the ROI to obtain the ROI image.

16. The non-transitory computer-readable storage medium of claim 14, wherein the background image is divided into a first region, a second region, and a third region,
the second region is located between the first region and the third region,
the first region is occupied by the first scaled image, and the third region is occupied by the second scaled image.

17. The non-transitory computer-readable storage medium of claim 16, before determining a detection result for the blind area of the vehicle based on the first detection box and the second detection box, the target detection method further comprising:
- removing the first detection box if there is an intersection between the first detection box and the second region; and
- removing the second detection box if there is an intersection between the second detection box and the second region.

* * * * *